Patented Dec. 3, 1935

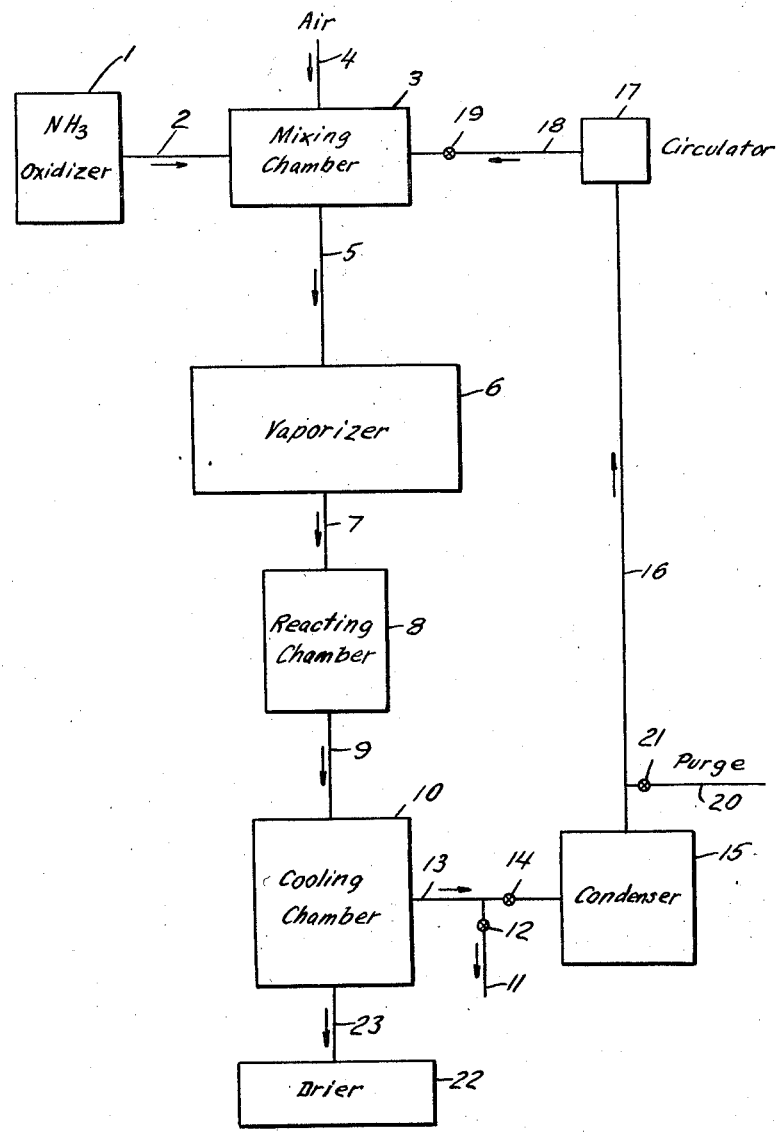

2,022,845

UNITED STATES PATENT OFFICE 2,022,845

PROCESS FOR THE OXIDATION OF HYDROCARBONS

Frank J. De Rewal, Camillus, N. Y., assignor to Atmospheric Nitrogen Corporation, New York, N. Y., a corporation of New York Application August 11, 1931, Serial No. 556,400

12 Claims. (Cl. 260—57)

This invention relates to a process for the oxidation of hydrocarbons, more particularly to a process for the partial oxidation of high boiling point hydrocarbons in the vapor phase in the presence of a gaseous catalytic agent, and includes correlated improvements and discoveries whereby the process is facilitated.

The oxidation of hydrocarbons of low boiling point, as methane and other natural gas hydrocarbons, with oxides of nitrogen has been effected to form alcohols, aldehydes and higher oxidation products, but difficulties attend the separation of the oxidation products from the gaseous materials with which these products are associated. It has also been proposed to oxidize higher boiling point hydrocarbons by employing chromic acid, nitrates, chlorates, nitric acid and oxides of nitrogen, and carrying out the operation in the liquid phase. However, these processes are accompanied by difficulties which are of two types, namely, high cost of the oxidation procedure and contamination of the products due to the presence of by-products arising from side reactions. When the oxidation of anthracene, for example, is carried out in the liquid phase by means of nitrates, nitric acid and oxides of nitrogen, the anthraquinone obtained is materially contaminated by nitro-derivatives, the removal of which is difficult and costly. It is a primary object of this invention to provide a process for the oxidation of hydrocarbons in the vapor phase, by means of a gaseous catalyst which process permits ready and effective separation of the unreacted hydrocarbon and of the reaction products from the gas mixture resulting from the operation of the process.

A further object of the invention is to provide a process whereby oxidation products of high purity may be obtained from impure or crude starting materials.

An additional object of the invention is to utilize oxides of nitrogen in a single pass or cyclic process for the simultaneous oxidation and purification of high boiling point hydrocarbons.

The invention provides as a specific object a process for the oxidation of anthracene to anthraquinone, and of naphthalene to phthalic anhydride which may be readily and economically carried out on a commercial scale with high yields.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention a hydrocarbon, more particularly a high boiling point hydrocarbon which yields oxidation products which are solids or liquids of high boiling point, may be oxidized by reacting the compound in the vapor phase with a gaseous oxidizing agent in the presence of a gaseous catalyst at an elevated temperature, and at a pressure suitable for reaction, and then separating the desired reaction products.

More particularly a high boiling point hydrocarbon containing an aromatic nucleus, such as toluene, xylene, fluorene and especially a hydrocarbon of the naphthalene or anthracene series, specifically naphthalene, anthracene and phenanthrene, may be heated sufficiently to vaporize the same, and admixed with a gas comprising oxygen and a gaseous catalytic agent such as a mixture of oxides of nitrogen. It has been found that satisfactory conversion of the hydrocarbon may be effected if hydrocarbon vapor is mixed with a gas containing oxygen and nitrogen oxides in such proportion that the total concentration of nitrogen oxides in the gas is preferably 23 to 25% and in any event not less than about three per cent. The molal ratio of available oxygen to hydrocarbon is preferably not substantially less than two. By available oxygen is meant that which is present both in the free state and as available oxygen in the oxides of nitrogen. The latter, while consisting not only of $NO_2$ but also $N_2O_3$, $N_2O_4$ and $N_2O_5$ may be considered as composed largely of $NO_2$ which contains available oxygen according to the following equation: $2NO_2 \rightarrow O_2 + 2NO$, so that the available oxygen from the oxides of nitrogen may be considered as 50 per cent of the volume of the oxides of nitrogen. The mixture containing hydrocarbon vapor, oxygen and oxides of nitrogen is passed through a reaction chamber at an elevated temperature which may be from about 300° C. to about 400° C. The exit gas may be subjected to fractional condensation to separate the oxidation products from the gaseous catalyst and other gaseous materials. The gaseous materials, including the catalyst, may be further treated in order to remove the various constituents thereof, as water and carbon dioxide, in order to render the gaseous catalyst suitable for further reaction in a single pass or cyclic operation of the process.

For a more complete understanding of the preferred modification of the process of this invention, reference should be had to the following detailed examples:

*Example I.*—The oxidation of anthracene to anthraquinone may be carried out as follows: Anthracene of about 85 per cent purity may be vaporized and admixed with a gaseous mixture consisting of about three parts of air and one part of oxides of nitrogen so that the resulting reaction mixture has a molal ratio of available oxygen to hydrocarbon of approximately four. This gas mixture has the following approximate composition:

|                      | Per cent |
|----------------------|----------|
| Oxides of nitrogen   | 23.4     |
| Air                  | 70.1     |
| Anthracene           | 6.5      |

The above mixture, heated to a temperature of about 300° C., is passed directly into a reaction chamber, which may consist of a tubular converter partially packed with broken brick. The reaction chamber is maintained at a temperature of 350° to 400° C. at atmospheric pressure and is of such dimensions that the anthracene remains therein for a sufficient time to effect its oxidation to anthraquinone. From the converter the gaseous mixture is passed to a cooling chamber maintained at a temperature suitable for the separation or precipitation of anthraquinone without material condensation or separation of other substances contained in the exit gases. The cooling chamber, for example, may be maintained at a temperature of 135° to 165° C. In this chamber the anthraquinone collects in crystalline form, while the small quantity of unoxidized hydrocarbon, substantially all of the water and the carbon dioxide, together with the nitrogen, inert gases, residual oxygen, and the oxides of nitrogen pass out of the cooling chamber. The anthraquinone collecting in the cooling chamber may be dried by means of a heated gaseous mixture, preferably one containing little free oxygen to obviate danger of explosion. Anthraquinone is obtained of 98 to 99 per cent purity, and the yield is about 90 per cent or better of the theoretical, based on the actual quantities of anthracene entering the reaction chamber.

The material undergoing oxidation, as will appear from the foregoing example, need not be of a high degree of purity. Thus the anthracene above employed was of 85 per cent purity and the operation produced anthraquinone of a high quality, equal to the product usually obtained by sublimation.

*Example II.*—In the oxidation of anthracene to anthraquinone by a cyclic operation of the process, a combination may be made with an ammonia oxidation process. With reference now to the drawing accompanying this specification, there may be provided a suitable source of nitrogen oxides, such as an ammonia oxidizer 1 in which a mixture of air and ammonia is reacted to form oxides of nitrogen, which are then conducted by a pipe 2 to a mixing chamber 3. In this chamber the oxidizer gas from the oxidizer 1 containing oxides of nitrogen is admixed with air introduced by means of a pipe 4. The mixture of oxidizer gas containing nitrogen oxides and air in the proportion of about one volume of oxidizer gas to about two volumes of air, is then conducted by a conduit 5 to a vaporizer 6 maintained at 300° C. in which anthracene or other high boiling point hydrocarbon is vaporized and mixed with the oxidizing agent and the gaseous catalyst. The resulting gaseous mixture containing oxygen, oxides of nitrogen and about 6 to 7 molal per cent of anthracene, is passed from the vaporizer 6 through a passage 7 to a reaction chamber 8 wherein the oxidation of the anthracene to anthraquinone is carried out at a temperature of from 300° to 400° C. The gas mixture resulting from the reaction is then led by a pipe 9 to a cooling chamber 10, which chamber is maintained at a temperature sufficiently low to effect the separation or precipitation of anthraquinone, in solid form, but at a temperature sufficiently high to prevent the condensation of other substances contained in the exit gas mixture, i. e, water vapor. The reaction product separating out in the cooling chamber may be transferred to a drier 22 wherein drying to the desired extent may be accomplished.

The gas from the condenser is preferably treated next to reduce its content of carbon dioxide and water vapor, and the resulting gas containing the oxides of nitrogen may then be returned to the mixing chamber for admixture with fresh quantities of air and anthracene. Accordingly, valve 14 in pipe 13 is opened, thus permitting the gases containing the oxides of nitrogen, water vapor, carbon dioxide, etc. to pass to a condenser 15 in which water may be removed. From the condenser the gases containing the oxides of nitrogen may be returned to the oxidation process by means of a circulator 17 through a pipe 16 leading thereto and a pipe 18 provided with a valve 19 leading therefrom and to the mixing chamber 3.

The operation of the process with return of the oxides of nitrogen by a circulatory operation as above described is accompanied by an increase in the inerts associated with the oxides of nitrogen. This increase in inerts may be limited by removing or purging a portion of the gaseous mixture through the pipe 20 having a valve 21. In the operation of the process, it will be observed accordingly that the oxidation may be effected either by a single pass of the gaseous catalyst or with a repeated utilization of the catalyst in a circulatory system. If it is desired to divert the whole uncondensed gas mixture from the circulatory system, valve 14 may be closed and the gases vented through pipe 11 by opening valve 12.

A gaseous catalyst which has been found to give satisfactory results, as above described, is a mixture of oxides of nitrogen. It is the belief of applicant that the action of this gaseous catalyst is that the nitric oxide present in the mixture combines with the oxygen in the oxidizing agent to form nitrogen peroxide, which in turn gives up the oxygen to the hydrocarbon in a nascent or very active form, effecting oxidation thereof. A suitable mixture of nitrogen oxides is that which may be obtained from the oxidation of ammonia, although other available sources may be used. It will be understood that applicant's invention is in no manner limited by the explanation of the action just given and also, it will be realized that it is not limited to the use of oxides of nitrogen derived from the oxidation of ammonia.

The oxidation process may be carried out by the use of any ready supply of oxygen in the gaseous phase, it having been found that air provides a ready and economical oxygen source. However, the gas mixture introduced may contain oxygen in a proportion other than that in which it occurs in air, and such mixtures are advantageous in various applications of the process. The particular oxidizing agent or agent containing oxygen utilized will depend on various factors, such as the hydrocarbon undergoing oxidation, the temperature at which the reaction chamber is maintained, and to a limited extent on the mode of operation and on the physical characteristics of the reaction chamber. Thus, for example, when operating the process as a circulatory system in which the inert gases and gaseous catalyst are recirculated, the air or other gas containing oxygen may have its oxygen content augmented, or on the other hand, the oxygen content may be reduced below that which is normally present in air. Further, the reaction mixture may contain inert gases such as carbon dioxide, nitrogen or steam. This is especially desirable when the gaseous catalyst is repeatedly employed. The use of these inert gases also effects a control on the temperature of the reaction chamber and decreases the explosive tendencies of the mixture.

The reaction chamber or converter may be of any convenient design which will permit control of the temperature. Preferably it should be constructed so as to permit operation at pressures which are greater than atmospheric. The converter, in order to augment the reaction by occasioning more intimate and frequent contact between the reacting materials and to assist in the maintenance of a uniform temperature, may be partially or completely filled, as indicated in example I, with a surface extending material, as broken grick, Raschig rings, and the like. The process of my invention may be carried out with advantage in the converter disclosed by Downs in U. S. Patent No. 1,789,809.

The cooling chamber in which the oxidation product is separated, should have, preferably a large capacity but it may be of any convenient design. It, however, should be provided with proper temperature controlling devices so that the oxidation product may be precipitated by fractional condensation without contamination with other gaseous products present, such as by water. The condensation of water in the same chamber with the anthraquinone should be avoided since the oxides of nitrogen react with water to form nitric acid, and the nitric acid in turn reacts with the oxidation product to form nitro-derivatives which it would be necessary subsequently to separate from the oxidized hydrocarbon.

Provision may also be made for passage of the purged gases, which are largely inert, from the circulatory system or other suitable source of inert gas through the drying chamber in which condensed oxidation product is dried. If desired, dual collecting chambers may be used in alternation, the inert gases being conducted into that chamber which is being used as a drier following its use as a collecting chamber in order to prevent the building up of an explosive mixture of the oxidation product, as anthraquinone and air.

The use of a gaseous catalyst according to the process of this invention, possesses the following advantages in addition to those hereinbefore pointed out: possibility of the catalyst fouling is eliminated as is also the possibility of an overheating of the active surfaces such as may attend the use of a solid catalyst per se; no loss of activity due to sintering of the contact mass; contact of the hydrocarbon with the catalyst is continuous and intimate.

Since certain changes may be made in carrying out the above process without departing from the scope of the invention, it is intended that all matter contained in the above description shall be interpreted as illustrative and not in a limiting sense.

I claim:

1. A process for the oxidation of hydrocarbons which comprises reacting a hydrocarbon of the naphthalene or anthracene series in the vapor phase with an oxygen-containing gas in the presence of oxides of nitrogen as a catalytic agent at a temperature of from 300° to 400° C.

2. A process for the oxidation of hydrocarbons which comprises vaporizing a hydrocarbon of the naphthalene or anthracene series, mixing said hydrocarbon vapor with a gas comprising oxygen and oxides of nitrogen, passing said mixture through a reaction chamber at a temperature of from 300° to 400° C. and recovering the oxidized hydrocarbon by cooling the gas mixture resulting from the reaction to a temperature at which the oxidized hydrocarbon is precipitated and the accompanying substances remain in gaseous form.

3. A process of catalytic vapor phase oxidation of hydrocarbons which comprises reacting a mixture comprising anthracene vapor, air and oxides of nitrogen, said mixture having substantially from six to seven per cent of anthracene and not substantially less than three per cent of oxides of nitrogen.

4. A process for the oxidation of hydrocarbons which comprises passing a mixture of anthracene vapor, air and oxides of nitrogen through a reaction chamber at a temperature of substantially from 300° to 400° C.

5. A process for the oxidation of hydrocarbons which comprises passing a mixture of anthracene vapor, air and oxides of nitrogen through a reaction chamber at a temperature of substantially from 300° to 400° C. and recovering the anthraquinone formed by cooling the exit gas mixture to a temperature at which anthraquinone alone is condensed and the accompanying substances remain in gaseous form.

6. A process for the oxidation of hydrocarbons which comprises preparing a mixture of anthracene vapor, air and oxides of nitrogen, said mixture having substantially from six to seven per cent of anthracene and a molal ratio of available oxygen to hydrocarbon of substantially four, reacting said mixture at a temperature of substantially from 300° to 400° C. and recovering anthracene from the reaction products by cooling the gas mixture resulting from the reaction to a temperature at which anthraquinone alone is condensed and the accompanying substances remain in gaseous form.

7. A cyclic process for the oxidation of hydrocarbons which comprises preparing a gas mixture comprising a vaporized hydrocarbon of the naphthalene or anthracene series, oxygen and oxides of nitrogen, the molal ratio of available oxygen to hydrocarbon in the reaction mixture being not substantially less than two, passing said mixture through a reaction chamber at a temperature of from 300° to 400° C., cooling the exit-gas mixture to a temperature at which the oxidized hydrocarbon alone is condensed, thereafter cooling the resulting gas mixture to a temperature at which water is condensed, and utilizing the oxides of nitrogen in the exit-gas to promote the oxidation of further amounts of said hydrocarbon.

8. A process of catalytic vapor phase oxidation of hydrocarbons which comprises reacting a high boiling point aromatic hydrocarbon in the vapor phase with a gas comprising oxygen in the presence of oxides of nitrogen as a catalytic agent.

9. A process of catalytic vapor phase oxidation of hydrocarbons which comprises reacting a high boiling point aromatic hydrocarbon in the vapor phase with a gas comprising oxygen and oxides of nitrogen as a catalytic agent and cooling the resulting reaction products to a temperature at which oxidation products of the hydrocarbon are condensed while the accompanying substances remain in gaseous form.

10. A process for the oxidation of hydrocarbons which comprises reacting a hydrocarbon of the naphthalene or anthracene series in the vapor phase with an oxygen-containing gas in the presence of oxides of nitrogen as a catalytic agent.

11. A process of catalytic vapor phase oxidation of hydrocarbons which comprises reacting a high boiling point aromatic hydrocarbon in the vapor phase with a gas comprising oxygen in the presence of not substantially less than 3% of oxides of nitrogen as a catalytic agent.

12. A process for the oxidation of hydrocarbons which comprises reacting a hydrocarbon of the naphthalene or anthracene series in the vapor phase with an oxygen-containing gas in the presence of not substantially less than 3% of oxides of nitrogen as a catalytic agent.

FRANK J. DE REWAL.